United States Patent [19]

Cousy

[11] Patent Number: 5,760,687
[45] Date of Patent: Jun. 2, 1998

[54] METHOD OF AND DEVICE FOR DETECTING THE PRESENCE OF A LIVING BEING OF A PARTICULAR SPECIES IN A SPACE MONITORED BY A DOPPLER SENSOR

[75] Inventor: Jean-Pierre Cousy, Limoges, France

[73] Assignees: Legrand; Legrand SNC, both of Limoges, France

[21] Appl. No.: 803,747

[22] Filed: Feb. 21, 1997

[30] Foreign Application Priority Data

Feb. 21, 1996 [FR] France .................. 96 02147

[51] Int. Cl.$^6$ .................................................. G08B 13/18
[52] U.S. Cl. ........................ 340/554; 342/27; 367/93
[58] Field of Search ........................ 340/554; 367/93, 367/94; 342/27, 28

[56] References Cited

U.S. PATENT DOCUMENTS

| | | | |
|---|---|---|---|
| 3,614,779 | 10/1971 | Sommer | 343/6 |
| 3,760,400 | 9/1973 | Galvin et al. | 340/554 |
| 4,290,126 | 9/1981 | McFadyen et al. | 367/93 |
| 4,400,700 | 8/1983 | Rittenbach | 343/55 |
| 4,952,939 | 8/1990 | Seed | 342/27 |
| 4,958,638 | 9/1990 | Sharpe | 128/653 |
| 5,150,099 | 9/1992 | Lienau | 342/27 |
| 5,345,240 | 9/1994 | Frazier | 342/28 |
| 5,448,501 | 9/1995 | Hablov | 364/517 |
| 5,576,977 | 11/1996 | Eskildsen | 340/554 |

FOREIGN PATENT DOCUMENTS 0600571 9/1981 European Pat. Off. ........ G01Z 13/56

OTHER PUBLICATIONS

Microprocessor controlled automatic clutter –Cancellation circuits for microwave systems to sense physiological movements remotely through the rubble (H.R. Chuang et al)— 1990.

*Primary Examiner*—Jeffery A. Hofsass
*Assistant Examiner*—John Tweel, Jr.
*Attorney, Agent, or Firm*—Young & Thompson

[57] ABSTRACT

The signal delivered by a Doppler sensor is treated after amplification, filtering and digitization by: means for determining the global energy of the digitized signal; autocorrelation test means for showing up a dominant frequency; a filter for rejecting that frequency; comparators for eliminating signals having energy less than a threshold; a filter for isolating a particular frequency band; and means for intercorrelation with a reference signal held in memory.

14 Claims, 1 Drawing Sheet

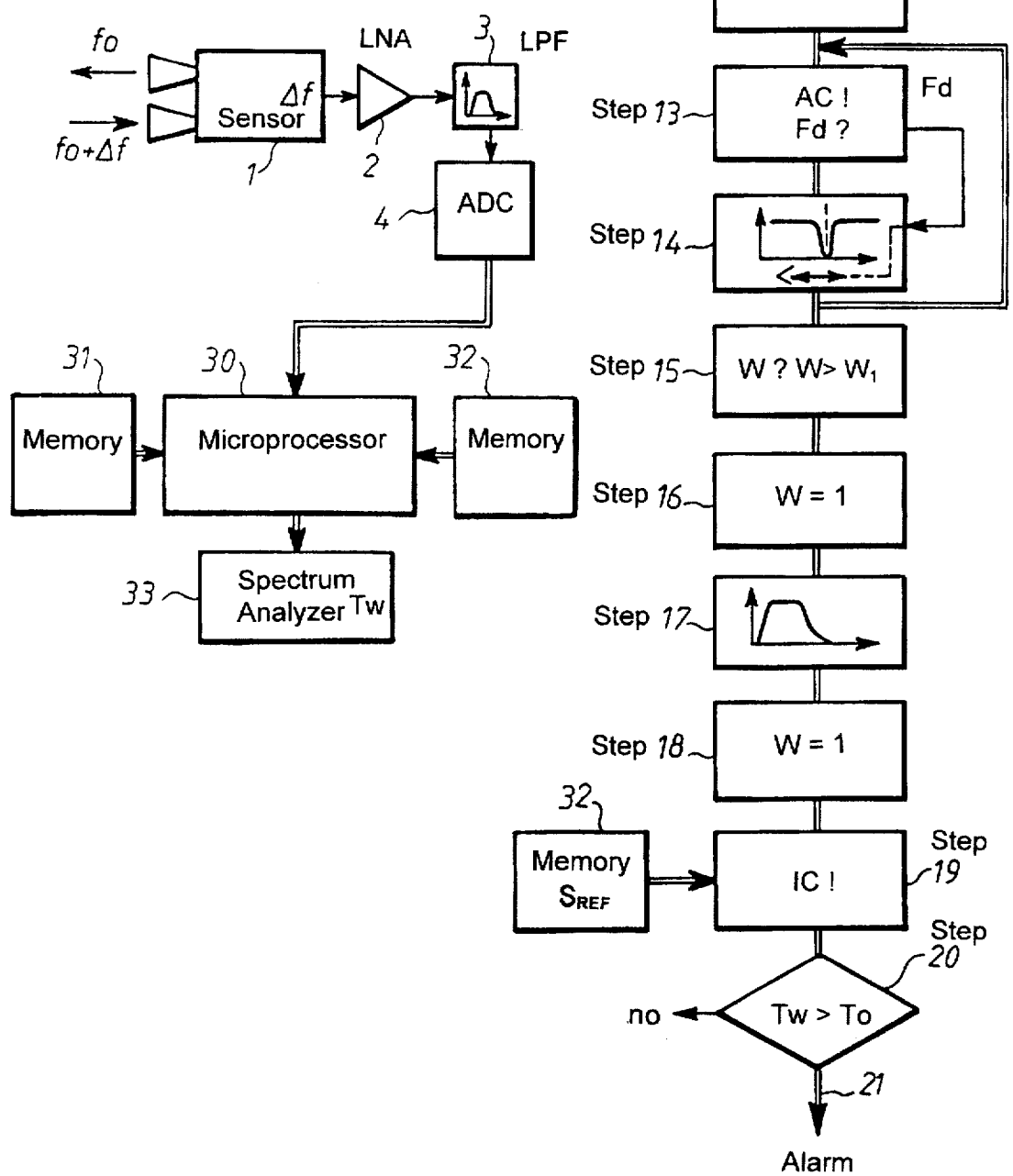

METHOD OF AND DEVICE FOR DETECTING THE PRESENCE OF A LIVING BEING OF A PARTICULAR SPECIES IN A SPACE MONITORED BY A DOPPLER SENSOR

BACKGROUND OF THE INVENTION

1. Field of the Invention

The invention concerns a method of detecting the presence of a living being of a particular species, in particular a human being, in a monitored space in which there is disposed a microwave Doppler sensor supplying a low-frequency signal produced by beating between a transmitted wave and a reflected wave frequency shifted by the Doppler-Fizeau effect by a moving target in the monitored space, in which method the signal, after any necessary amplification and filtering, is digitized and processed to show up in the frequency spectrum of the signal from the sensor peculiarities specific to the species of the living being so that only the presence of a being of this species is recognized.

The invention also concerns a device for implementing the above method.

2. Description of the Prior Art

The protection of spaces, in particular of premises, against intrusion by ill-intentioned persons, in the absence of guards on patrol, or even between two patrols by guards, has expanded significantly in recent times because of the increase in the frequency of attempted intrusion and because it has become possible to employ sensors for remotely sensing the abnormal presence of beings. The sensors can be acoustical, operating in the audible but more especially ultrasonic band, optical, operating in the visible or infrared band, or electromagnetic (pulse or Doppler radar). Apart from video surveillance cameras, which in practise require the presence of guards, the sensors most widely used are infrared sensors and microwave Doppler sensors, which rely on beating between a transmitted wave, generally a wave transmitted continuously, and a reflected wave frequency shifted by a moving target intruder.

The invention is very precisely situated in this domain, although it would not be impossible for an intruder detector system to employ infrared sensors in conjunction with Doppler sensors which make use of the invention.

The shift is known to be caused by the radial speed of the target relative to the transmitter, the target forming a reflector for the wave, in accordance with the equation:

$$\Delta f = 2f0 \frac{v_r}{c} \quad (I)$$

where $\Delta f$ is the frequency shift, $f0$ is the frequency of the transmitted wave, $v_r$ is the radial velocity of the target and $c$ is the speed of light.

Incidentally, it will be noted that equation (I) above is that for the non-relativistic Doppler effect, which in principle amounts to the same thing as the relativistic Doppler-Fizeau effect given the very low value of the ratio $$\frac{v_r}{c}.$$

Like all sensors responsive only to moving targets, Doppler sensors are not at a disadvantage due to the presence of fixed targets consisting of surrounding fixed structures, such as the walls and internal walls and the furnishings of monitored premises, provided that the sensors do not have to pivot to scan the space to be monitored. However, the pivoting speed can in this case be chosen such that the radial velocities of the fixed obstacles relative to the sensors and the corresponding frequency shifts do not interfere with the wanted signals or can be ignored by processing the signal.

Processing signals from a Doppler sensor naturally presupposes filtering with an appropriate bandwidth, firstly to improve the signal/noise ratio by reducing the noise level at the input (the power of white noise is proportional to the bandwidth), and secondly to eliminate unwanted frequencies such as those which are caused by scanning the sensor.

French standard NF C 48 229, relating to intruder detector devices, has set a range of target speeds for intruder monitoring between 0.3 m/s and 3 m/s. With a basic frequency of 9.9 GHz (in the X band allocated by the telecommunications authorities), the limiting frequencies are 19.9 Hz and 199 Hz, i.e. virtually 20 Hz and 200 Hz.

The reliability of an intruder monitoring system obviously depends first and foremost on the sensitivity of the sensors, as otherwise an intruder may not be sensed. However, it is almost equally dependent, and to a degree that increases with the sensitivity of the sensors, on their selectivity, if they are not to react to signals whose source is not an intruder.

Discriminating signals according to their source is made possible to the fact that the Doppler signals have peculiarities specific to their source, these peculiarities constituting what are known as the signatures of the original causes.

The study of signatures involves collecting signatures of disturbing phenomena that have already been recognized, largely by empirical means. French standard NF C 48 229 refers to interference caused by fluorescent tubes. Intruder detector systems using Doppler sensors have been subject to interference by fans, vertical slatted blinds, drapes and water flowing in gutters.

Apart from fluorescent tubes, the disturbing phenomena are objects moving in the field of the sensors, generating Doppler signals (fan blades, moving drapes or blinds, falling water droplets). Fluorescent tubes cause interference signals by reflection of the microwave signals from the plasma formed by the discharge on each half-cycle of the AC line voltage. The return signal picked up by the sensor is modulated with a fundamental frequency equal to twice the frequency of the AC line voltage and a very wide spectrum of harmonics.

The aim of the invention is to provide a method of detecting the presence of a living being of a particular species in which the signals from a Doppler sensor are processed in order to recognize the presence of a living being of that particular species with a good degree of certainty.

SUMMARY OF THE INVENTION

This aim is achieved by a method of detecting the presence of a living being of a particular species, in particular a human being, in a monitored space in which there is disposed a microwave Doppler sensor supplying a low-frequency signal produced by beating between a transmitted wave and reflected wave, frequency shifted by the Doppler-Fizeau effect by a moving target in the monitored space, wherein the signal, after any necessary amplification and filtering, is digitized and processed to show up in the frequency spectrum of the signal from the sensor peculiarities specific to the species of the living being in order to recognize the presence of a being of that species, characterized in that the processing of the digitized signal comprises the following steps:

a) determining the overall energy of the digitized signal and eliminating signals with energy less than a threshold energy;

b) applying to the signal produced by step (a) at least one autocorrelation test adapted to detect the presence of a dominant frequency;

c) filtering the digitized signal by means of an adaptive filter adjusted to reject the dominant frequency detected in step (b);

d) determining the global energy of the signal produced by the filtering step (c) and eliminating the signals having energy less than a threshold energy;

e) filtering the signal from step (d) to isolate a particular frequency band that is stable and specific to movements of the particular species of the living being;

f) applying to the signal from step (e) a test of temporal intercorrelation with a reference signal specific to the particular species of living beings and held in memory to define an interspectral energy and sending of at least one two-state signal corresponding to interspectral energies respectively greater than and less than a threshold energy.

A study of the signatures of the interference phenomena mentioned above has shown that some of these phenomena have a marked periodic character and that their signatures consist in one or more characteristic frequencies that have a dominant presence in the signal from the Doppler sensor. This may be predictable if the phenomena which constitute the original causes are analyzed. However, it will be necessary to identify and to carry out a census of these phenomena. Moreover, it has not previously been possible to foresee that filtering out these dominant frequencies would leave a signal containing the essential information constituting the required signatures, or that the signatures of interference phenomena with no marked periodic character remaining in the signal after eliminating the dominating frequencies could be distinguished from the signatures of interest by analysis of their intercorrelation with a reference signature.

Steps (a) to (c) of the method of the invention lead to the elimination of the essentially periodic interference signals; step (a) reduces the noise at the input and step (b) identifies the presence of dominant frequencies by autocorrelation and controls the adjustment of the filtration in step (c) to block the digitized dominant frequencies in a coherent manner and with minimal risk of distortion.

Furthermore, studies of the signatures of living beings carried out under the aegis of the assignees of the Applicants, and in particular those of humans, have shown up two types of signals, one aleatoric and the other substantially reproducible in time. The first can be attributed to occasional movements of the living being and the second to physiological movements such as respiration and the bending of the body on walking. These physiological movements have varying rhythms, but a relatively constant succession within these rhythms; it has been found that, firstly, the signals caused by these movements convey specific information in particular frequency bands and that, secondly, this information can be identified by temporal intercorrelation with a reference signal specific to the particular species of living beings.

Consequently, after step (d) which blocks the signals carrying no information (following elimination of the dominant frequencies), step (e) is executed to select the particular frequency band, which removes the unwanted components of the signals, followed by step (f) which judges whether a living being of the particular species is present or not in the monitored space, with a minimum risk of error.

Steps (b) and (c) are preferably reiterated until the dominant frequencies are eliminated, before moving on to step (d).

The monitored space may be the location of multiple interference phenomena, or one and the same source of interference may generate more than one dominant frequency.

The various filter steps are preferably followed by steps in which the overall amplitude of the signal is brought to a normalized level, which facilitates subsequent digital processing.

In another aspect, the invention proposes a device for detecting the presence of a living being of a particular species, in particular a human being, in a monitored space, of enhanced selectivity, including a microwave Doppler sensor adapted to supply a low-frequency signal dependent on movements of the target relative to the sensor, produced by beating between a transmitted wave and a wave reflected by a moving target in the monitored space, means for digitizing the signal from the sensor after any necessary amplification and filtering, processor means including a microprocessor with associated programs and at least one memory, for appropriately formatting and comparing the digitized signal with reference signals to detect in the frequency spectrum of the signal from the sensor peculiarities specific to the particular species of the living being, which device is characterized in that it comprises:

(m)—means for determining the energy of the digitized signal and eliminating the signals with energy less than a threshold energy, (n)—means for applying to the signal from the previous means at least one autocorrelation test adapted to show up the presence of a dominant frequency, (p)—a first adaptive filter receiving at its input the digitized signal and adjusted to reject the dominant frequency detected by the autocorrelation test, (q)—comparator means for determining the global energy of the signal filtered by the first adaptive filter, capable of eliminating the signals with global energy less than a threshold, (r)—a second filter receiving the signal from the comparator means and adjusted to isolate a particular frequency band that is stable and specific to movements of the particular species of living being, and (s)—means for applying to the signal, reduced to the previously mentioned particular frequency band, a temporal test of intercorrelation with a reference signal held in memory and specific to the particular species of living being, the test defining an interspectral energy, and for emitting at least one two-state signal corresponding to an interspectral energy respectively greater than and less than a threshold.

The above device is adapted to implement the method in accordance with the invention.

Secondary features of the invention and its advantages will emerge from the following description given by way of example with reference to the accompanying drawings.

BRIEF DESCRIPTION OF THE DRAWINGS

FIG. 1 is a flowchart of the operations that constitute the method of the invention.

FIG. 2 is a block diagram of the devices for implementing the method of the invention.

DETAILED DESCRIPTION OF THE PREFERRED EMBODIMENT

In the chosen method of detecting the presence of a living being of a particular species, a human being in the chosen example, in a monitored space, shown in the FIG. 1 flowchart and in the FIG. 2 block diagram, a Doppler sensor with a resolution of 1 Hz emits a beam of microwave radiation at frequency f0, 9.9 GHz in this example, into a monitored space and receives radiation reflected by obstacles in the monitored space. The radiation reflected from moving obstacles, or targets, is subject to a frequency shift Δf by the Doppler effect, in the accordance with equation already given:

$$\Delta f = 2 f_0 V_r / c$$

The sensor 1 extracts the frequency Δf produced by beating between the transmitted and reflected radiation. The latter frequency is amplified by a low-noise amplifier 2 and filtered by a low-pass filter 3 with a cut-off frequency of 200 Hz to limit noise (proportional to the bandwidth) and to prevent aliasing. The signal is then applied to an analogue/digital converter 4 using a sampling frequency of 512 Hz.

As can be seen more clearly in FIG. 2, the digitized signal is fed to a microprocessor 30 which is associated with two memories 31 and 32 respectively containing signal processing programming elements and reference signatures, of which more later.

The processing (10) of the digitized signal from the analogue/digital converter 4 comprises step 11 through 20, which are initially discussed in terms of the specific results that they procure, with the computation processes that they comprise described subsequently.

The processing is effected in successive cycles with a duration of 1 second (512 samples) representing a compromise between the required analysis resolution, the computation capacity of the microprocessor and the required speed of detection of the presence of an intruder.

Step 11 determines the energy content of the Doppler signal and eliminates signals having an energy content less than a threshold energy, this threshold energy representing discrimination between noise and Doppler signals. These two operations are symbolized by the formulas W? and W>$w_0$. Discrimination by energy level has been chosen in preference to discrimination by amplitude level because of the random nature of the noise. The probability of translating a noise spike into an actual Doppler signal must be very low, and the energy distribution of noise has a standard deviation which is proportionately very much less than that of the amplitude distribution. In practise, with the chosen bandwidth sampling frequency and cyclic period, the mean noise power is $1.24 \times 10^{-3}$ V$^2$ and the standard deviation is $9.09 \times 10^{-5}$ V$^2$; setting the threshold energy at 6 standard deviations above the mean noise energy, i.e. at $1.79 \times 10^{-3}$ V$^2$, the probability of interpreting Gaussian noise as a wanted signal is once in 32 years for an iteration period of 1 second.

Step 12 modifies or normalizes the level of the signal from step 11, the signature comparison operations presupposing that the signals compared have similar amplitudes. This normalization step is symbolized by the formula W=1.

Steps 13 and 14 eliminate the dominant frequencies due to interference signals with a marked periodic character. Step 13 applies an autocorrelation test (AC!) which shows up the dominant frequency or frequencies (Fd). A periodic phenomenon is correlated with itself over its period. Step 14 applies band-stop filtering (digital adaptive filtering) to the dominant frequency (Fd) shown up in step 13. If more than one dominant frequency has been detected, steps 13 and 14 are repeated to eliminate all the dominant frequencies.

Step 15 determines the energy of the signal after eliminating the dominant frequencies and eliminates the signals with energy contents below a threshold, these signals being deemed to contain no useful information; these operations are symbolized by the formulas W? and W>$w_1$.

Step 16 normalizes the level of the signal from step 15, with a similar aim to that of step 12, and is symbolized by the formula W=1.

Step 17 applies filtering by a band-pass filter corresponding to a range of approximately 15 Hz–35 Hz. Analyses of human signatures carried out during the development of the invention have shown that virtually all human signatures have stable peculiarities in this spectral domain, while residual spurious signatures in the signal from step 16 do not feature any components likely to interfere with the human signatures in this range. The filter, which must cause minimal distortion of the energy of the spectrum, with a flat in-band response curve, is a Butterworth band-pass filter with the characteristics set accordingly (lower cut-off frequency, higher cut-off frequency and order). In practise the lower and higher cut-off frequencies are respectively 16 Hz and 34 Hz and the order is the sixth order.

Furthermore, filtering is followed by a search for the presence of signals after filtering.

Step 18 normalizes the signal from the filter step 17, in a similar way to steps 12 and 16, and for the same reason.

Step 19 applies a temporal intercorrelation test with a reference signal $S_{REF}$ contained in a memory 32, this test supplying an interspectral energy $T_W$. This step 19 is symbolized by the formula IC!. The reference signal $S_{REF}$ was obtained by the following process:

Several dozen human signatures were collected, varying the direction of displacement of the target person relative to the sensor (radially and transversely), the speed of movement and the distance from the target to the sensor;

Intercorrelation tests were carried out between all the signals corresponding to the signatures to show the spread of the rates of recognition of each signature relative to the other signatures, as characterized by a mean and a standard deviation;

The signature with the best mean and the lowest standard deviation was chosen. The movement characteristics of the signature retained were transverse motion at a distance of 3 m at a speed of 1.4 m/s (5 kph).

Note that in themselves transverse movements do not cause any Doppler shift, so that the corresponding signature is created by movements specific to the human being, and not by their overall displacement.

Step 20 compares the interspectral energy $T_W$ determined in step 19 with a threshold energy $T_0$ (this operation is symbolized by the formula $T_W > T_0$). If the result is YES, a signal is sent to the output 21 corresponding to the detection of the presence of a human being in the monitored space.

It will be understood that it is possible to compare the interspectral energy with a plurality of threshold energies to define a plurality of levels of certainty as to the presence of a human being in the monitored space. As shown in FIG. 2, the signal $T_W$ is fed to an intercorrelation spectrum analyzer 33. The appearance of an interspectral energy greater than a low threshold energy triggers appropriate analysis of the intercorrelation spectrum to bring about different actions according to the degree of certainty as to the presence of a human being and the risk incurred.

The various steps described above will now be reviewed in terms of the computation processes employed.

At the output of the analogue/digital converter 4 the signal is made up of 512 samples per second that are transferred into a buffer memory in cycles of 1 second duration (first phase of step 11). The samples are then divided by 0.2 and stored in a second buffer memory.

After normalization, the signal is in the form of a series:

$$x_1(k) = A * x(k) \text{ for } k=0,\ldots,511 \qquad (1)$$

The Fourier transform $X_1(n)$ of this series is computed using the formula:

$$X_1(n) = \sum_{k=0}^{N-1} \exp(-j2\pi kn/N) \cdot x_1(k) \quad (2)$$

for $n = 0, \ldots, 511$

The coefficients $\exp-j2\pi\ kn/N$ are calculated beforehand and stored in memory.

The spectral power is then computed using the formula:

$$P_1(n) = X_1^*(n).X_1(n)/512^2 \text{ for } n=0, \ldots 511 \quad (3)$$

To determine the peak power it is necessary to run through the computed values of $P_1(n)$; if this value is below the set threshold, processing is halted.

To advance to the next step 12, it is necessary to allow for the fact that the signal is not continuous, but split into cycles 512 samples, which makes it necessary to eliminate the noise due to the transitions at the start and end of each cycle. This is obtained by applying the signal to a Hanning window using the formula:

$$x_2(k)=x(k).(0.54-0.46.\cos(2\pi k/N)) \text{ with } k=0, \ldots, N-1 \quad (4)$$

Note that the series of computations uses frequency and time components of the signal; the Hanning window represents a good compromise for the transmission of these two types of component.

Step 12 includes normalization; the computation of the series of normalized values utilizes a multiplication factor for the terms of the input series, after windowing, of 10 divided by the difference between the maximal and minimal amplitude values of the input series.

Step 13 effects two successive autocorrelations giving $r_3(j)$ and then $r_4(j)$ by the formulas:

$$r_3(j)=\Sigma x_3(k)x_3(j-511+k) \text{ for } j=0, \ldots, 1\ 022$$
$$\text{and } k \text{ from 0 to 511} \quad (5)$$

$$r_4(j)=\Sigma x_3(k)r_3(j-1022+k) \text{ for } j=0, \ldots, 2\ 044 \quad (6)$$

The series $r_4(j)$ is completed by assigning it the value 0 for the terms 2 045 through 2 047.

Note that the double autocorrelation can detect two dominant frequencies with similar energy contents, rather than a mean frequency.

In fact, the autocorrelation computations by the equations (5) and (6) require the execution of too many operations, too much computation time and too many memory locations. It is therefore expedient to carrier out a Fourier transform, an autocorrelation in the frequency domain, and a reverse Fourier transform to return to the time domain.

Following the autocorrelation computations, the estimated power Pe is computed using an equation similar to equation (3) and the estimated frequency Fe is computed.

Step 14 includes adaptive filtering. A third order Butterworth band-stop filter is used having lower and higher cut-off frequencies of respectively 0.95 Fe and 1.05 Fe.

Steps 13 and 14 are repeated if there is still a dominant frequency in the output from step 14.

Step 15 includes an estimate of the spectral power, using a Fourier transform by means of an equation similar to an equation (2) and a spectral energy computation using an equation similar to an equation (3). Once again, the spectral energy is compared to a threshold and processing is halted if the energy of the signal is below this threshold, which means that at the outset, only the periodic interference signals were present.

Step 16 normalizes the signal.

As has been shown, step 17 is a filter step using a sixth order Butterworth filter with lower and higher cutoff frequencies of 16 Hz and 34 Hz, respectively. The coefficients (a(k)) are calculated beforehand and the process consists in computing the series:

$$x_6 = \sum_{k=0}^{N-1} a(k)x_5(n-k)$$

for $n = 0, \ldots, 511$

The signal $x_6$ is analyzed to determine if it has a significant spectral energy, using a Fourier transform (equation (2)), spectral power computation (equation (3)) and peak power determination.

If the signal has significant energy, it is normalized again in order for the intercorrelation of step 19 to be effective.

In step 19, if y(k) denotes the reference signature held in the memory 32, the intercorrelation between the two signals $x_7(k)$ from step 18 and y(k) is given by:

$$r_6(i) = \sum_{k=0}^{N-1} x_7(k)y(i-511-k) \quad (7)$$

for $i = 0, \ldots, 1\ 022$

At this stage, processing moves into the frequency domain to simplify the computation. y(k) and $x_7(k)$ are lengthened to 1 023 points, with y(k)=0 and $x_7(k)$=0 for k=512, ..., 1 022, and we have:

$$R_6(n)=Y^*(n)x_7(n)$$

The series $x_7(k)$ and Y(k) are lengthened to 1 024 points to use the first computation of the Fourier transform (with precalculated coefficients).

After the reverse Fourier transform, the spectral power $P_{15}(n)=R^*_6(n).R_6(n)/1\ 024^2$ is computed, and then the estimated power. The latter is compared to a threshold in step 20.

It will be understood that the process of detecting the presence of a living being, a human being in this example, is based on a minute analysis of peculiarities imparted to the Doppler signal by the human being in a specific fashion, in particular independent of their deliberate displacements, and a minute analysis of the spurious signals that can degrade the Doppler signal, and that the processing of the signal has been conceived in order, firstly, to eliminate the components of the signal likely to mask the human signature and, secondly to isolate a domain in which the human signature has the majority of its stable peculiarities.

Moreover, it will be understood that detecting the presence of a living being is not limited to the detection of an intruder in a monitored space or premises. The possibility of analyzing the signal produced by the intercorrelation of step 19 in order to trigger various actions according to the degree of certainty as to the detection of the presence of a living being has already been mentioned. It goes without saying that the response to the detection of a presence need not be a protective action such as an alarm. It is possible to monitor the presence of a human being at a workstation, or even simply to control the lighting of premises or of part of premises.

Furthermore, the detection of the presence of living beings other than man, by the use of a specific reference signature determined by a process similar to that used to choose a reference human signature, is possible and can have beneficial aspects, whether for monitoring the presence or the absence of living beings of a chosen particular species.

There is claimed:

1. A method of detecting the presence of a living being of a particular species, in a monitored space in which there is disposed a microwave Doppler sensor supplying a low-frequency signal produced by beating between a transmitted wave and a reflected wave frequency shifted by the Doppler-Fizeau effect by a moving target in the monitored space, wherein said signal from said sensor, after any necessary amplification and filtering, is digitized and processed to show up in the frequency spectrum of said signal peculiarities specific to the species of said living being in order to recognize the presence of a being of that species, and wherein the processing of said digitized signal comprises the following steps:

a) determining the overall energy of said digitized signal and eliminating signals with energy less than a threshold energy;

b) applying to the signal produced by step (a) at least one autocorrelation test adapted to detect the presence of a dominant frequency;

c) filtering said digitized signal by means of an adaptive filter adjusted to reject said dominant frequency detected in step (b);

d) determining the global energy of said signal produced by said filtering step (c) and eliminating signals having energy less than a threshold energy;

e) filtering the signal from step (d) to isolate a particular frequency band that is stable and specific to movements of the particular species of said living being;

f) applying to the signal from step (e) a test of temporal intercorrelation with a reference signal specific to the particular species of said living being and held in memory to define an interspectral energy and emitting at least one two-state signal corresponding to interspectral energies respectively greater than and less than a threshold energy.

2. The method claimed in claim 1 wherein said autocorrelation test in step (b) is a double autocorrelation test.

3. The method claimed in claim 2 wherein steps (b) and (c) are reiterated until dominant frequencies are eliminated before advancing to step (d).

4. The method claimed in claim 1 wherein, between steps (a) and (b), there is inserted a step (a') in which the global energy of said signal is normalized.

5. The method claimed in claim 1 wherein between steps (d) and (e) there is inserted a step (d') in which the global energy of said signal is normalized.

6. The method claimed in claim 1 wherein in step (e) said signal is passed through an appropriately adjusted filter.

7. The method claimed in claim 1 wherein between steps (e) and (f) there is inserted a step (e') in which the global energy of said signal is normalized.

8. A device for detecting the presence of a living being of a particular species, in a monitored space, of enhanced selectivity, including a microwave Doppler sensor adapted to supply a low-frequency signal dependent on movements of a target relative to the sensor and produced by beating between a transmitted wave and a wave reflected by a moving target in said monitored space, means for digitizing said signal from said sensor after any necessary amplification and filtering, processor means including a microprocessor with associated programs and at least one memory, for appropriately formatting and comparing said digitized signal with reference signals to detect in the frequency spectrum of said signal from said sensor peculiarities specific to the particular species of said living being, which device comprises:

(m)—means for determining the energy of said digitized signal and eliminating signals with energy less than a threshold energy, (n)—means for applying to the signal from the previous means at least one autocorrelation test adapted to show up the presence of a dominant frequency, (p)—an adaptive first filter receiving at its input said digitized signal and adjusted to reject said dominant frequency detected by said autocorrelation test, (q)—comparator means for determining the global energy of the signal filtered by said adaptive first filter and capable of eliminating signals with global energy less than a threshold, (r)—a second filter receiving said signal from said comparator means and adjusted to isolate a particular frequency band that is stable and specific to movements of the particular species of said living being, and (s)—means for applying to said signal, reduced to said particular frequency band, a temporal test of intercorrelation with a reference signal held in memory and specific to the particular species of said living being, the test defining an interspectral energy, and for emitting at least one two-state signal corresponding to an interspectral energy respectively greater than and less than a threshold.

9. The device claimed in claim 8 wherein said energy determining and signal elimination means, said autocorrelation test means, said first filter, said comparator means, said second filter and said temporal autocorrelation test means are implemented in the form of appropriate computation programs associated with said microprocessor and executed in sequence.

10. The device claimed in claim 8 wherein said Doppler sensor (1) emits at the frequency of 9.9 GHz.

11. The device claimed in claim 8 wherein said reference signal corresponds to lateral displacement of a human being at a distance of 3 m from said Doppler sensor at a speed of 1.4 m/s.

12. An application of a device as claimed in claim 8 to detecting the intrusion of a person into a protected space.

13. The method claimed in claim 1, wherein said living being is a human being.

14. The device claimed in claim 8, wherein said living being is a human being.

* * * * *